United States Patent
Leitner et al.

(10) Patent No.: US 10,240,910 B2
(45) Date of Patent: Mar. 26, 2019

(54) SYSTEMS AND METHODS FOR COMPRESSIVE IMAGE SENSOR TECHNIQUES UTILIZING SPARSE MEASUREMENT MATRICES

(71) Applicants: Stefan Leitner, Carbondale, IL (US); Haibo Wang, Carbondale, IL (US); Spyros Tragoudas, Carbondale, IL (US)

(72) Inventors: Stefan Leitner, Carbondale, IL (US); Haibo Wang, Carbondale, IL (US); Spyros Tragoudas, Carbondale, IL (US)

(73) Assignee: Board of Trustees of Southern Illinois University on Behalf of Southern Illinois University Carbondale, Carbondale, IL (US)

(*) Notice: Subject to any disclaimer, the term of this patent is extended or adjusted under 35 U.S.C. 154(b) by 0 days.

(21) Appl. No.: 15/698,236

(22) Filed: Sep. 7, 2017

(65) Prior Publication Data
US 2018/0073860 A1    Mar. 15, 2018

Related U.S. Application Data

(60) Provisional application No. 62/384,510, filed on Sep. 7, 2016.

(51) Int. Cl.
| | |
|---|---|
| *H04N 5/00* | (2011.01) |
| *G01B 11/02* | (2006.01) |
| *H04N 5/232* | (2006.01) |
| *G03B 35/08* | (2006.01) |
| *H04N 5/335* | (2011.01) |

(Continued)

(52) U.S. Cl.
CPC .............. *G01B 11/02* (2013.01); *G03B 35/08* (2013.01); *H04N 5/232* (2013.01); *H04N 5/335* (2013.01); *H04N 5/341* (2013.01); *H04N 5/347* (2013.01)

(58) Field of Classification Search
CPC ........ H04N 5/335; H04N 5/341; H04N 5/232; H04N 5/347; G03B 35/08; G01B 11/02
See application file for complete search history.

(56) References Cited

U.S. PATENT DOCUMENTS

| | | | |
|---|---|---|---|
| 2014/0313387 A1* | 10/2014 | Vogelsang ........... | H04N 5/3696 348/308 |
| 2016/0013773 A1* | 1/2016 | Dourbal ................. | G06F 17/16 708/209 |

(Continued)

*Primary Examiner* — Ping Y Hsieh
(74) *Attorney, Agent, or Firm* — Polsinelli PC

(57) ABSTRACT

Systems and methods for compressive image sensor techniques based on sparse measurement matrices are disclosed. A method to perform compressive sensing (CS) measurement operations for image sensors limits pixel summation to be within neighboring pixels and hence dramatically simplifies CS image sensor circuits and reduces their power consumption while providing better image quality compared to conventional random measurement matrix based methods. A sparse measurement matrix is applied to pixel data to generate a desired number of summation groups, each summation group consisting of outputs from an equal number of pixel cells. Each pair of summation groups contains the same number of shared outputs from pixel cells. From the summation groups, an image captured by the pixel cells is recovered.

20 Claims, 9 Drawing Sheets

(51) Int. Cl.
*H04N 5/341* (2011.01)
*H04N 5/347* (2011.01)

(56) References Cited

U.S. PATENT DOCUMENTS

| | | | |
|---|---|---|---|
| 2016/0028985 A1* | 1/2016 | Vogelsang | H01L 27/14641 348/294 |
| 2017/0188039 A1* | 6/2017 | Siddiqui | H04N 19/51 |
| 2017/0208263 A1* | 7/2017 | McGarry | H04N 5/3355 |

* cited by examiner

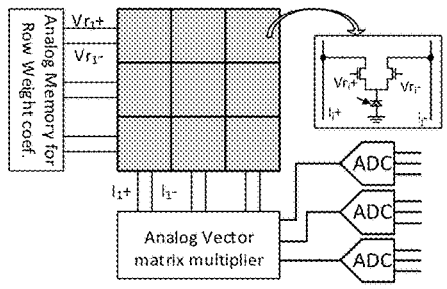
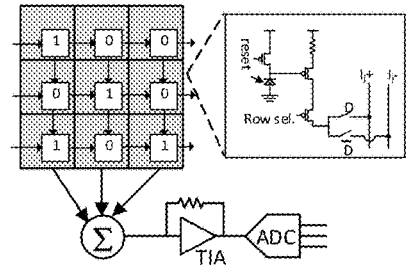
FIG. 1A  FIG. 1B
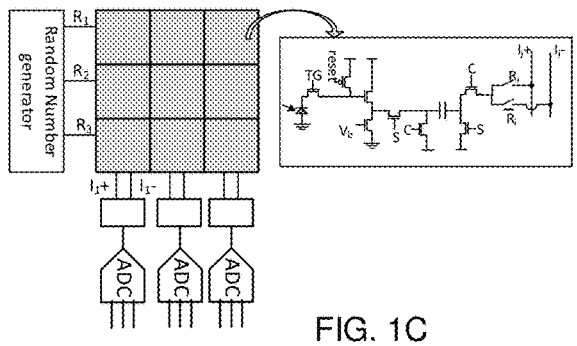
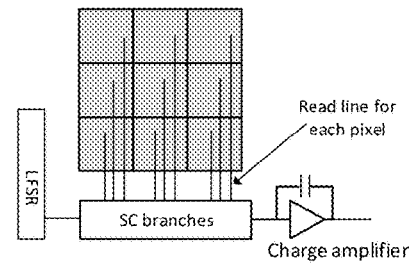
FIG. 1C  FIG. 1D
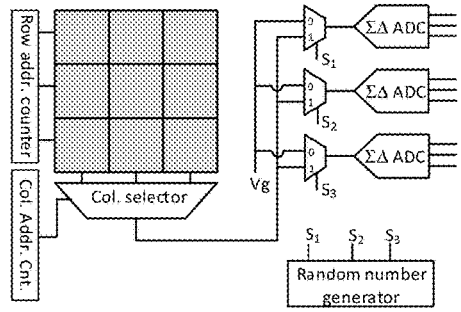
FIG. 1E
PRIOR ART

|  | Y. Oike, et al. 2013 | V. Majidzadeh, et al. 2010 | N. M. Katic, et al. 2013 | M. Dadkhah, et al. 2014 | Present Disclosure |
|---|---|---|---|---|---|
| Pixel Cell Design | 4T conventional | 3T cell & local memory (DFF) & logic (3 NAND) | 10T custom | 3T conventional | 3T conventional |
| Measurement Vector Generation | LFSR | LFSR | LFSR | LFSR | N/A |
| Additional Circuits for Supporting Random Summation | Multiplexer tree | None | None | Multiplexer tree | None |
| Pixel Summation Circuit | Voltage summation by $\Sigma\Delta$ modulator | Current summation | Charge summation | Charge summation | Current summation |
| Compression Ratios | 4, 8, 16 | 3.3 | 4 | 1.33, 2, 4, 8 | 4, 8 |
| Simulated PSNR (dB) | 35 (R=4) 31.5 (R=8) 28.5 (R=16) | NA | NA | NA | 37.8 (R=4) 32.5 (R=8) |
| Energy/Frame (uJ) | 195 (R=4) 98.4 (R=8) | 1278 | 3.27-5.8 | NA | 1.4 (R=4) 0.73 (R=8) |

FIG. 7

| Component | Values |
|---|---|
| $M_1$, $M_2$* | 360nm/240nm |
| $M_3$** | 160nm/120nm |
| $M_4$, $M_5$, $M_6$, $M_7$, $M_8$, $M_9$, $M_{10}$ | 640nm/360nm |
| $M_{11}$** | 320nm/120nm |
| $M_{12}$** | 640nm/120nm |
| $M_{13}$ | 160nm/1um |
| $M_{14}$ | 160nm/360nm |
| $M_{15}$, $M_{16}$** | 1.6um/120nm |
| $C_1$ | 100 fF |
| $R_1$ | 100 kΩ |

* Thick silicon oxide transistors
** Low power transistors

FIG. 8

| Amplifier | Gain | $f_T$ (MHz) | Current dissipation (µA) |
|---|---|---|---|
| Amp. $A_1$ | 100 | 1 | 0.5 |
| Opamp $A_2$ | 7000 | 100 | 23 |

FIG. 9

SYSTEMS AND METHODS FOR COMPRESSIVE IMAGE SENSOR TECHNIQUES UTILIZING SPARSE MEASUREMENT MATRICES

CROSS REFERENCE TO RELATED APPLICATIONS

This is a non-provisional application that claims benefit to U.S. provisional application Ser. No. 62/384,510 filed on Sep. 7, 2016, which is incorporated by reference in its entirety.

GOVERNMENT SUPPORT

The invention was made with government support under grants NSF IIP 1535658 and NSF IIP 1361847 both awarded by National Science Foundation. The government has certain rights in the invention.

FIELD

The present disclosure generally relates to compressive image sensor techniques and in particular to systems and methods for compressive sensing image sensor techniques utilizing a sparse measurement matrix.

BACKGROUND

As cameras and camera sensors become increasingly ubiquitous, there are increasing demands for low-power and high-resolution image sensors. For example, such devices are extremely desirable for hand-held or wearable gadgets, and might be mandatory in swallowable medical devices due to power and heat dissipation constraints. Over the past several decades, remarkable progress in image sensor power reduction and resolution improvement has been achieved by exploiting novel circuit techniques and utilizing increasingly advanced fabrication technologies. Nevertheless, the image capture and processing flow has largely remained the same. The image information is first captured by sensor pixels in an analog format. Then, each pixel output is converted into digital data by analog to digital converters (ADCs). Thereafter, the digital data is compressed, processed or transmitted. The ADC operation is relatively power hungry in the image capturing process. As such, as the number of ADC operations has increased dramatically with the relentless improvement of image resolution, further reducing the power consumption of high-resolution image sensors has become increasingly challenging.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIGS. 1A-1E illustrate prior art Compressive Sensing (CS) image sensor circuits, according to aspects of the present disclosure;

FIG. 7 presents comparison between the present system and existing CS image sensor circuits, according to aspects of the present disclosure;

FIG. 8 depicts key component values used in the CS image sensor;

FIG. 9 depicts amplifier performance parameters used in the CS image sensor.

Corresponding reference characters indicate corresponding elements among the view of the drawings. The headings used in the figures do not limit the scope of the claims.

DETAILED DESCRIPTION

Figure 2:
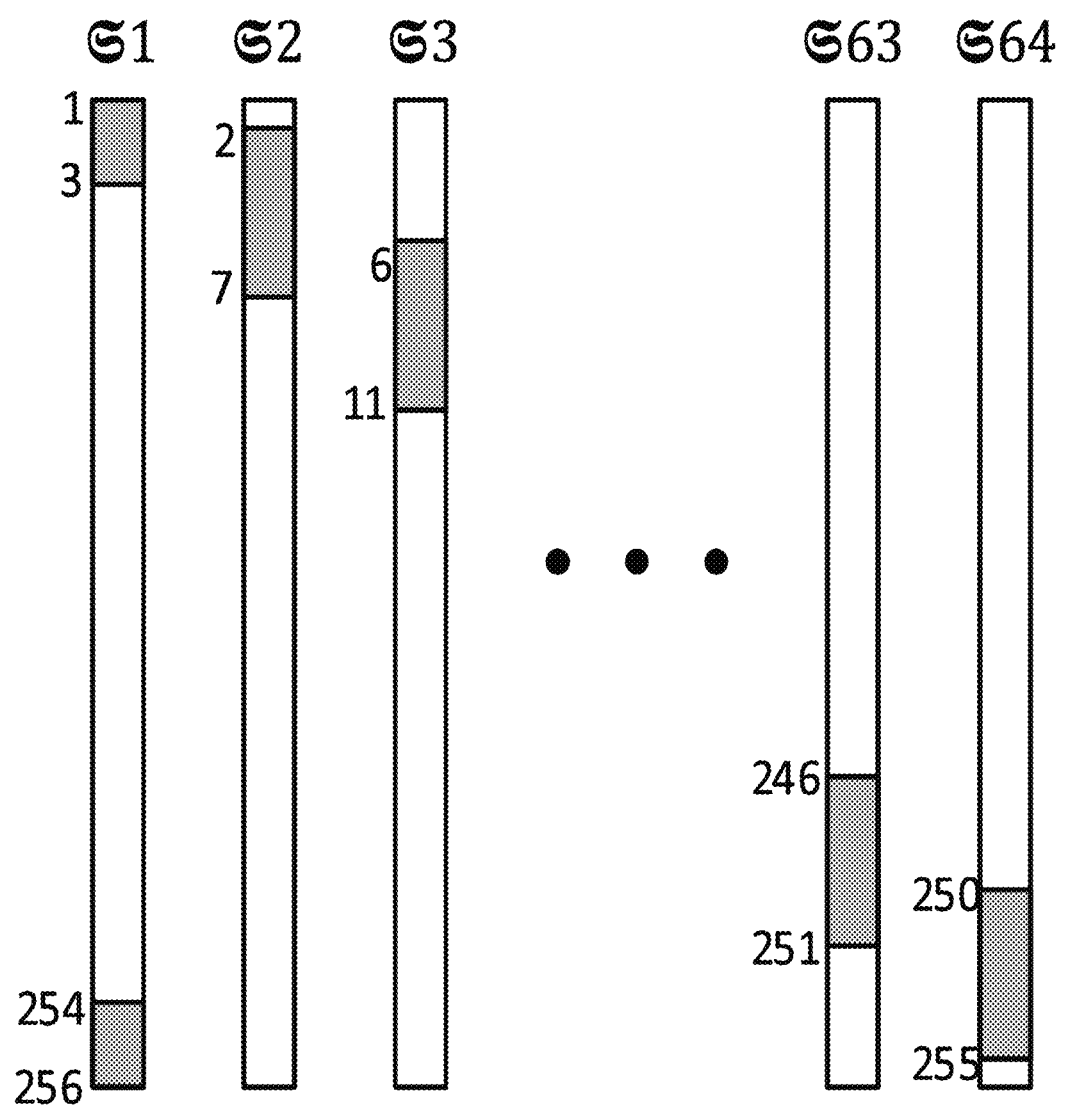
FIG. 2 depicts an illustrative example of a CS measurement pattern, according to aspects of the present disclosure.

Recently, Compressive Sensing (CS) has emerged as a promising technique to address the need for low-power, high-resolution image sensors. Instead of digitizing every pixel, a CS image sensor only digitizes a small set of random pixel summations. The process to obtain the random pixel summations is often referred to as a CS measurement operation and the total number of measurements required can be significantly smaller than the total number of pixels present. From this small set of measurement data, the image can still be reconstructed with high fidelity via CS techniques, providing an interesting paradigm to reduce ADC operations as well as power consumption in image sensor circuits, such as Complementary Metal-Oxide-Semiconductor (CMOS) image sensor circuits.

For purposes of explanation, assume that pixel data is denoted by a one dimensional vector x with N elements. (Although images are two dimensional, the pixel values can be rearranged into one dimensional format for the convenience of discussion.) Then, the CS measurement operation can be described by a matrix operation $\phi \cdot x$, where $\phi$ is a measurement matrix with M rows and N columns, with M<N. At present, existing CS image sensor circuits use dense random measurement matrices, which require complicated circuit implementation and pose stringent signal swing requirements.

A number of CS image sensors have been reported in the literature. Some of them perform CS measurement operations in the optical domain before the image is captured by pixel cells. This helps reduce the number of pixels on the sensing device and can be desirable in applications where it is expensive to have a large number of pixels on the sensors, e.g. infrared sensors. Other CS image sensors perform CS measurement operations on pixel cell outputs. Such sensors are often referred to as circuit-based CS image sensors, and are designed mainly to reduce sensor ADC operations and hence the power consumption of the sensor.

At present, circuit-based CS image sensors can be mainly differentiated by their technique of operation in performing a CS measurement. FIGS. 1A-E depict various circuit-based CS image sensors and measurement processes and operations. FIG. 1A illustrates a random measurement process which uses a computational pixel design, wherein differential current output is proportional to the product of the projected light intensity and its row drive voltage. The current outputs of the pixel cells within the same column are summed at the bit lines and the row drive voltages serve as the weight factors in the summations. The column outputs are further processed by an analog vector matrix multiplier (VMM) to produce the CS measurement data set. To simplify the circuit implementation, other CS measurement circuits limit the weight factors to 1 and −1 in the summation.

Another approach embeds shift registers into the pixel array as shown in FIG. 1B. Random bit streams generated by linear feedback shift registers (LFSRs) are shifted into the array before taking the measurement. If the register bit in a pixel cell is 1, the current output of the pixel is directed to positive bit line $I_{i\_}$; otherwise, it is connected to negative bit line $I_{j\_}$. The currents from the positive and negative bit lines are subtracted to generate the measurement results. However, embedding D flip-flops (DFFs) into pixel cells significantly increases the size of pixel cell circuits. Also, summing a large number of pixel outputs poses stringent signal swing requirements.

Another existing design is shown in FIG. 1C, which limits the summation operation for pixels within the same column, partially lessening the signal swing challenge. It still follows the random summation patterns and uses complicated pixel cell design. Conventional compact pixel cells, e.g. 3-transistor (3T) or 4T pixel designs have also been used in CS image sensor circuits. These designs partition the pixel array into blocks of 16×16 pixels and limit the random summations for pixels within the blocks. Also, large LFSRs are used to generate random bit patterns to guide the summations. These designs limit the measurement matrix elements to 1 and 0. If a matrix element is 1, the corresponding pixel output is included in the summation; if it is 0, the corresponding pixel output is excluded from the summation.

A design as shown in FIG. 1D uses charge amplifiers to perform pixel summations. The fan-in limitation of the charge amplifier as well as the amplifier output swing limit the block size. Another existing design as shown in FIG. 1E integrates the summation function into $\Delta\Sigma$ circuits, feeding the selected pixel signals to the ADC input in a round-robin manner during the $\Delta\Sigma$ modulation process. Large multiplexer circuits are used to route pixel outputs to the $\Delta\Sigma$ input. Overall, existing CS CMOS image sensors use random measurement matrices for pixel summations. They typically require large LFSRs to generate the random bit patterns and utilize complicated circuits to implement the random summation operation. These factors adversely affect the scalability and the power efficiency of existing CS image sensor circuits.

It is with these observations in mind, among others, that various aspects of the present disclosure were conceived and developed.

Theory of Compressive Sensing

CS techniques originate from an interesting mathematical question. Suppose vector x has N elements and satisfies the sparsity condition of order k (a vector is k-sparse if it has at most k non-zero or significant elements). Is it possible to recover vector x from M linear observations (with M<N)? The linear observations or measurements can be described as matrix operation y=A·x, where A is a matrix with M rows and N columns. In general, solving for N unknown variables from M equations (M<N) is not well-posed and there is no unique solution. However, by taking advantage of x being k-sparse, and if matrix A meets certain requirements, it is possible to recover x with high confidence level and good accuracy. Several conditions for selecting matrix A to guarantee the recovery of x have been derived by experts in mathematical fields, such as constraints in terms of spark, coherence, null space, restricted isometry property (RIP), etc. Meanwhile, various methods to recover x have been also developed, including adaptive binary search, $l_l$ minimization (or basis pursuit), greedy pursuits, etc. Among them, the RIP condition and the basis pursuit recovery method are frequently used in CS related applications. The RIP was originally defined as follows. Matrix A obeys the RIP with constant $\delta_k$ if:

$$(1-\delta_k)\|x\|_2^2 \leq \|A \cdot x\|_2^2 \leq (1+\delta_k)\|x\|_2^2 \quad (1)$$

for all k-sparse vectors x, with $\|x\|_2^2$ denoting the standard $l_2$-norm on $\mathbb{R}^d$. To be able to recover vector x, $\delta_k$ needs to be smaller than certain thresholds. Intuitively, $\delta_k$ indicates how well the linear observations, (i.e. A·x), preserve the energy of the vector or signal x. The smaller $\delta_k$ is, the better the signal energy of x is preserved. Later, the RIP is generalized with the following condition:

$$(1-\delta_k)\|x\|_p^2 \leq \|A \cdot x\|_p^2 \leq (1+\delta_k)\|x\|_p^2 \quad (2)$$

This condition (2) shows that a RIP with p=1, denoted as RIP-1, can also be used to select a matrix A to guarantee the recovery of x. Note that these conditions discussed above are typically sufficient, but not necessary. For example, a matrix that satisfies RIP-1 guarantees signal recovery, but may not satisfy the original RIP-2 condition, and vice versa. Thus neither of the conditions is stronger than the other.

In real world applications, many signals are not sparse in their original form, but become sparse after being projected into another domain. The projection operation can be described by x=ψ·c, where x is the original signal, ψ is the representation or sparse basis, and c is the coordinate vector of x with respect to basis ψ. For example, a single-tune sinusoidal signal is not sparse in the time domain but its Fourier coefficient vector is very sparse, containing only one element. Image signals and many biomedical signals manifest similar behaviors. For these types of signals, CS techniques can recover an approximation of the coordinate vector c from only a small set of measurement data. Once c is known, the underlying signal can be easily computed.

Following the above principles, a CS image sensor generates a small set of linear observations by y=φ·x, where x is the vector of pixel data and φ is the measurement matrix. Since the size of the linear observations y can be dramatically smaller than that of pixel data x, ADC operations as well as sensor output data can be significantly reduced. At the receiving end, c can be recovered by solving the following $l_1$ minimization problem:

$$\min\|c\|_1, \text{ subj.to } y=\phi\cdot\psi\cdot c \quad (3)$$

Thereafter, the pixel data x can be reconstructed by x=ψ·c. Note that the product of φ·ψ is the matrix A used in the mathematical formulations (1) and (2) above. Often, a random matrix is used as measurement matrix φ, since it has been shown that in the random case, the product φ·ψ satisfies the RIP or other CS signal recovery constraints with high probability.

Measurement Technique

Existing CS image sensor circuits use random measurement matrices φ because the product of the random measurement matrix φ and the sparse basis matrix ψ is likely to satisfy the RIP constraints. Images are generally sparse with respect to several bases, such as the discrete Fourier basis and the inverse discrete cosine transform (IDCT) basis, a subgroup of Fourier basis. The vectors in IDCT correspond to samples of the cosine function with variable frequency starting from DC given as:

$$\psi(k, j) = \sum_{i=1}^{N} \alpha(i) \left[ I(i, j) \cdot \cos\left(\frac{\pi(2k+1)(i-1)}{2N}\right) \right] \quad (4)$$

where I is the N×N dimensional identity matrix and $$\alpha(i) = \sqrt{\frac{1}{N}}$$

when i=1 and $$\alpha(i) = \sqrt{\frac{2}{N}}$$

when i>1. A signal is k-sparse if it can be represented by a linear combination of at most k cosine waveforms of variable frequencies, and the other N−k coefficients are negligible. Since RIP guarantees signal recovery for all k-sparse signals, CS implementations employing random matrices are invariant to the image frequency content, as long as not too many frequency components are significant.

However, for natural images (i.e. images existing in the natural world), the vast majority of the signal power is carried by low frequency components; high frequency components are in general very small in such images. Statistical data show that the signal power of natural images decreases exponentially along the frequency axis. Intuitively, this presence of primarily low frequency content leads to gradual changes among neighboring pixel values. In other words, the average variance of signal power among neighboring pixels will be small. Taking advantage of this property, the present disclosure describes a method to perform CS measurement operations for image sensors which performs signal summations only for a small number of neighboring pixels.

The operation of the disclosed method can be explained with reference to the following example, which begins with reference to FIG. 2. Without losing generality, assume that a CS measurement is conducted for a pixel column containing 256 pixels and the compression rate R is 4. R is defined as the ratio of the number of pixels over the number of CS measurements. Thus, 64 CS measurements are to be generated, which are denoted by $\mathfrak{S}_1$, $\mathfrak{S}_2$, $\mathfrak{S}_{64}$ in FIG. 2. To generate a single CS measurement, six neighboring pixels are added together, with an overlap of two pixels between two neighboring summation groups. Except for $\mathfrak{S}_2$, the starting point for the next CS measurement will be four pixels beyond the first pixel of the previous CS measurement group, thereby yielding the overlap of two pixels between neighboring summation groups.

For example, in FIG. 2, the starting and ending pixel positions of each summation group are listed on the left side of the shaded summation group regions, and the 64 summation groups all refer back to the same underlying pixel column containing 256 pixels. The first CS measurement $\mathfrak{S}_1$ consists of the summation over the outputs of pixels 1-3 and 254-256. The next CS measurement $\mathfrak{S}_2$ will have an overlap of two pixels with $\mathfrak{S}_1$, and therefore contains the six pixels pixel 2-7. The third CS measurement $\mathfrak{S}_3$ will have an overlap of two pixels with $\mathfrak{S}_2$, and therefore contains the six pixels 6-11. Note that the second CS measurement $\mathfrak{S}_2$ has an overlap of two pixels with both $\mathfrak{S}_1$ and $\mathfrak{S}_3$.

Thereafter, the beginning pixel or pixel position of each subsequent measurement group is moved by 4 pixels to start the next CS measurement. For the convenience of discussion, let x be an N×1 vector formed by stringing together the pixel signals from an L×L pixel array in a column after column manner with N=L×L. Then, the pixel summations can be described by the following equations:

$$\mathfrak{S}_1^m = \sum_{i=m\cdot L+1}^{m\cdot L+3} x(i) + \sum_{i=(m+1)\cdot L-2}^{(m+1)\cdot L} x(i) \quad (5)$$

$$\mathfrak{S}_k^m = \sum_{i=m\cdot L+4\cdot k-6}^{m\cdot L+4\cdot k-1} x(i), \text{ for } k > 1$$

where m indicates the pixel column for which the CS measurement is performed for 0≤m≤L−1.

In general, to generate M CS measurements for a pixel array containing N pixels, the size of summation groups should be $$\frac{N}{M} + OL,$$

where OL represents the number of overlapping pixels between two neighboring summation groups. In the example of FIG. 2, M equals 64, N equals 256, and OL equals 2. Thus, the size of the summation groups is $$\frac{256}{64} + 2 = 6.$$

As a guideline, OL is preferably selected as $$\frac{R}{2},$$

if possible, recalling that R is the compression ratio. For given N, M, and OL values, the entries of measurement matrix φ can be determined as:

$$\phi(i, j) = \begin{cases} 1 & \text{if } 1 + \frac{(i-1) \cdot N}{M} \leq j \leq \frac{i \cdot N}{M} + OL \\ 0 & \text{otherwise} \end{cases} \quad (6)$$

for 1<i<M, 1<j<N. For i=1, M (i.e. the first row and the last row), the pattern can be slightly adjusted to meet the image size constraint, since the dimension of the frame may not be a multiple of $$\frac{N}{M}$$

in general.

Figure 3:
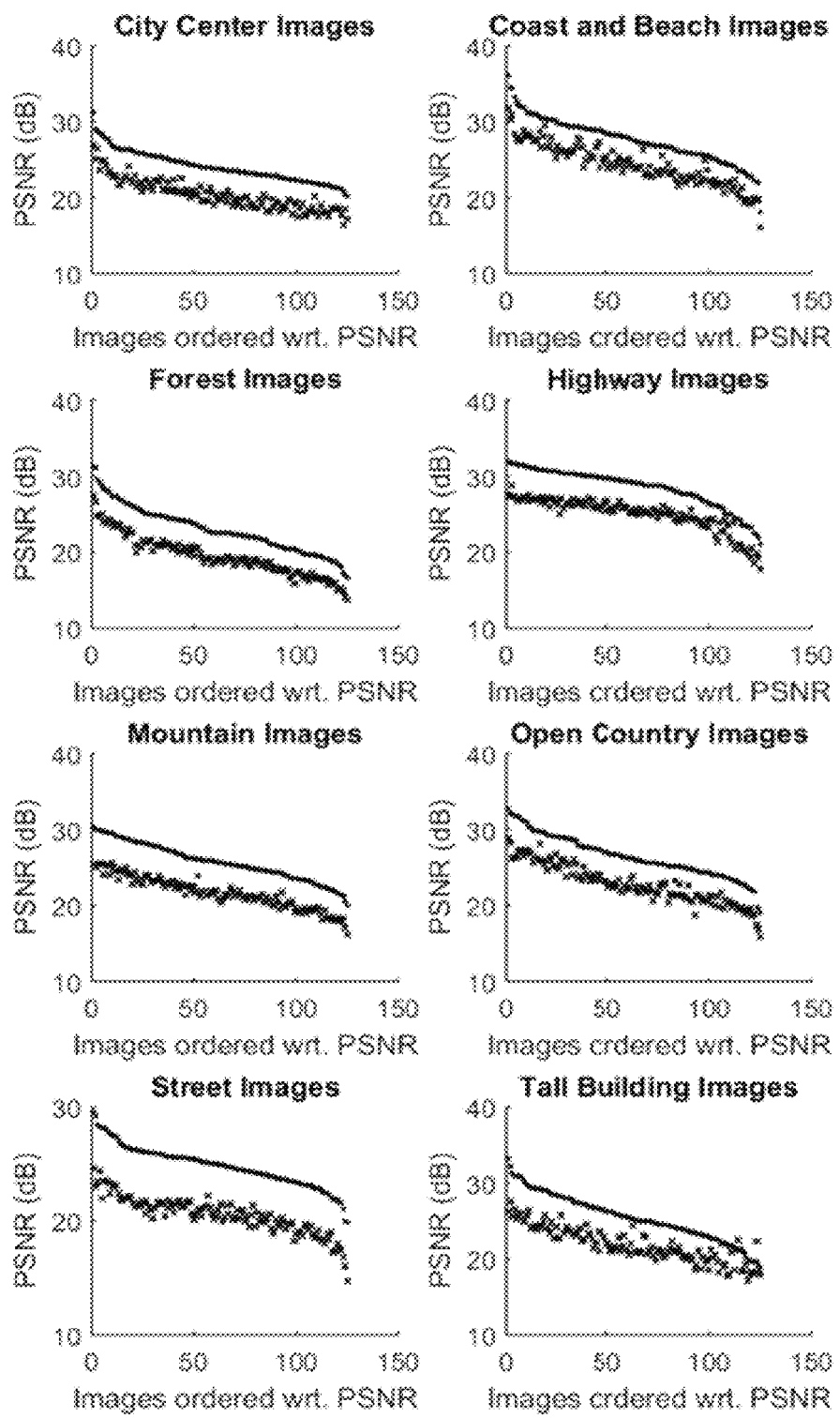
FIG. 3 presents a comparison of image qualities obtained with the proposed sparse measurement matrices and conventional random matrices for 1000 benchmark images.

The above formula indicates that the majority of the elements of the measurement matrix $\phi(i, j)$ are 0 and hence, such matrices are referred to as sparse measurement matrices. Note that the presently discussed sparse measurement matrices do not meet RIP constraints. However, the RIP condition represents a sufficient condition to guarantee the recovery of any k-sparse signals, but is not a necessary condition, especially when the signals of interest are mainly represented by low frequency components with respect to their sparse bases. Simulations with various natural images show that sparse measurement matrices, as defined above, achieve better performance than random matrices. 1000 images from a publically available image benchmark database have been used in the simulation study. The database contains eight image categories, each category covering different types of scenery (i.e. 'City Center Images', 'Forest Images', 'Mountain Images', 'Street Images', 'Coast and Beach Images', 'Highway Images', 'Open Country Images', and 'Tall Building Images'). The study examined the first 125 images from each of the eight scenery categories. The peak signal to noise ratios (PSNR) of the reconstructed images with the proposed CS measurement method are plotted (by the solid lines) in descending order in FIG. 3, which contains one graph for each of the eight image categories. For comparison purposes, the PSNRs of the corresponding images obtained using the conventional random measurement method are also plotted using × markers in the figure. Note that higher PSNR values indicate better image qualities. As such, the advantage of using the proposed measurement technique with spare matrices over the conventional technique of random matrices is evident, as it results in higher PSNR values for all the images except for three (one 'Forest Image', and two 'Tall Building Images'), for a rate of 0.3%. Even in these three outlier cases, both methods lead to roughly the same image qualities.

CS Image Sensor Circuit Design

The present sparse measurement matrices advantageously enable a CS image sensor circuit to be implemented in a very compact way, in a footprint that previously was limited only to conventional image sensors. In particular, a CS image sensor circuit of the present disclosure can use compact pixel cell designs and further does not require complex circuits to perform CS measurement operations. For the purposes of clarity, discussion of the proposed CS image sensor circuit and techniques will continue to be made with reference to a 256×256 pixel array and a compression rate of 4, as discussed previously, although it is understood that the disclosed methods and techniques can be applied to other sizes of pixel arrays and different compression rates without departing from the scope of the disclosure. Additionally, it is noted that the following discussion assumes that current-mode pixel cells are used in the pixel array, although voltage-mode pixel cells may also be used, in which pixel summations are carried out in terms of voltage or charge summations.

Figure 4:
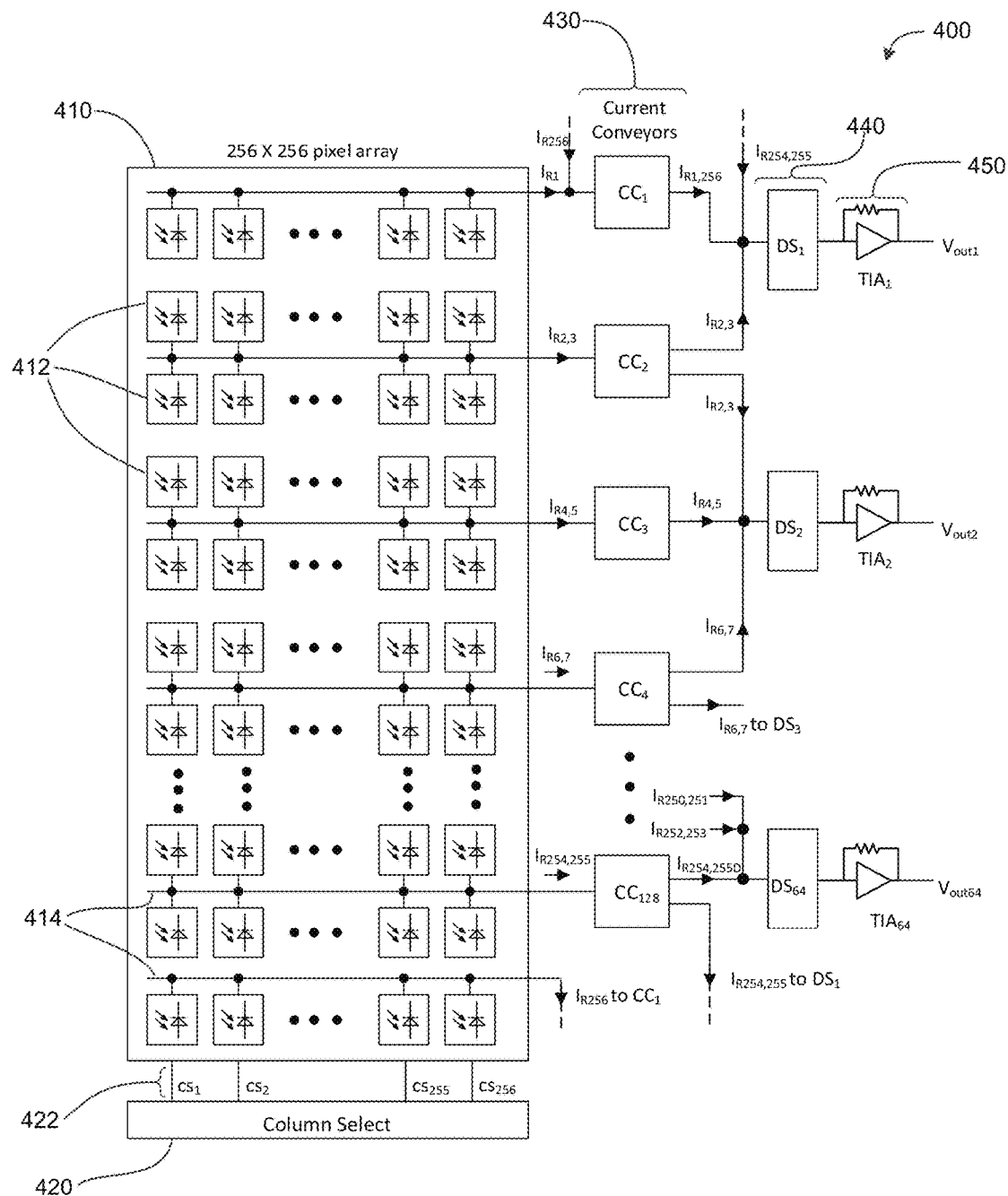
FIG. 4 depicts a circuit for a CS image sensor based on a sparse measurement matrix, according to aspects of the present disclosure.

FIG. 4 depicts a block diagram 400 of an exemplary CS image sensor of the present disclosure. As illustrated, pixel array 410 contains a plurality of pixels 412 and measures 256×256, for a total of 65,536 pixels. The disclosed CS measurement method based on sparse measurement matrices can conduct pixel summations in a row-by-row or column-by-column manner, however, block diagram 400 is designed to conduct CS measurements in a column-by-column manner (i.e. by sequentially asserting column select lines $CS_1, CS2_2, \ldots, CS_{256}$, labeled cumulatively as 422) in order to remain consistent with the example presented by FIG. 2.

In order to conduct CS measurements in a column-by-column manner, the plurality of pixels 412 are communicatively coupled to a plurality of pixel read lines 414 (also referred to as bit-lines) that are routed horizontally within the pixel array 410. This is in contrast to the plurality of column select lines 422, which are routed vertically and driven by a column selection circuit 420 outside of the pixel array 410. Row read operations can be performed in parallel for a given column, and as such, there is no row selection circuit.

During pixel read operations, the $i^{th}$ column is selected by asserting $CS_i$ to a value of 1, thereby permitting all the pixels within the $i^{th}$ column to be accessed. For example, to access the $1^{st}$ column, $CS_1$ would be asserted to a value of 1. Within the selected column $CS_i$, the output currents of the pixel cells that share the same bit-line are added together at the bit-line and then are fed to the inputs of a plurality of current conveyors 430, which are labeled as $CC_1, CC_2, \ldots, CC_{128}$ in the diagram 400.

As illustrated, the bit-lines 414 are shared by two pixel cells per column (i.e. two rows per bit-line). Note that each bit-line of the plurality of bit-lines 414 is labeled with the rows to which it communicatively couples. Beginning at the top of pixel array 410, the first bit-line is labeled "$I_{R1}$". Immediately below the first bit-line is a second bit-line labeled "$I_{R2,3}$", indicating that it communicates with only pixels in the second and third rows.

Additionally, the plurality of current conveyors 430 may also be divided into two categories. The first category of current conveyor has a single current output port (e.g. current conveyor $CC_1$), while the second category of current conveyor has dual output ports (e.g. current conveyor $CC_2$). The dual output port current conveyors are provided in order to accommodate the overlaps between adjacent CS measurement groups, as was previously illustrated in FIG. 2. The outputs of the plurality of current conveyors 430 are further summed according to the measurement patterns before being fed to the inputs of a plurality of delta double sampling (DS) circuits 440, which are individually denoted by $DS_1, DS_2, \ldots, DS_{64}$ in diagram 400. The current outputs of the DS circuits 440 are then amplified and converted to voltage signals $V_{out1}, V_{out2}, \ldots, V_{out64}$ by trans-impedance amplifiers (TIAs) 450.

Thanks to its regularity, the CS measurement pattern is hardwired into the design 400 of the image sensor. Recall that the measurement pattern discussed with respect to FIG. 2 called for a first measurement group $\mathsf{G}_1$ of pixels 254-256, 1-3, and note that $DS_i$ receives as input the current readings from $I_{R254,255}$, $I_{R1,256}$, and $I_{R2,3}$. A second measurement group $\mathsf{G}_2$ of pixels 2-7 correlates to $DS_2$, which receives as input the current readings from $I_{R2,3}$, $I_{R4,5}$, and $I_{R6,7}$, and so on. Thus, the disclosed image sensor advantageously neither requires LFSRs for random bit generation nor uses complex pixel cells or complicated pixel signal routing circuits that are otherwise required in order to support pixel random summation.

Figure 5:
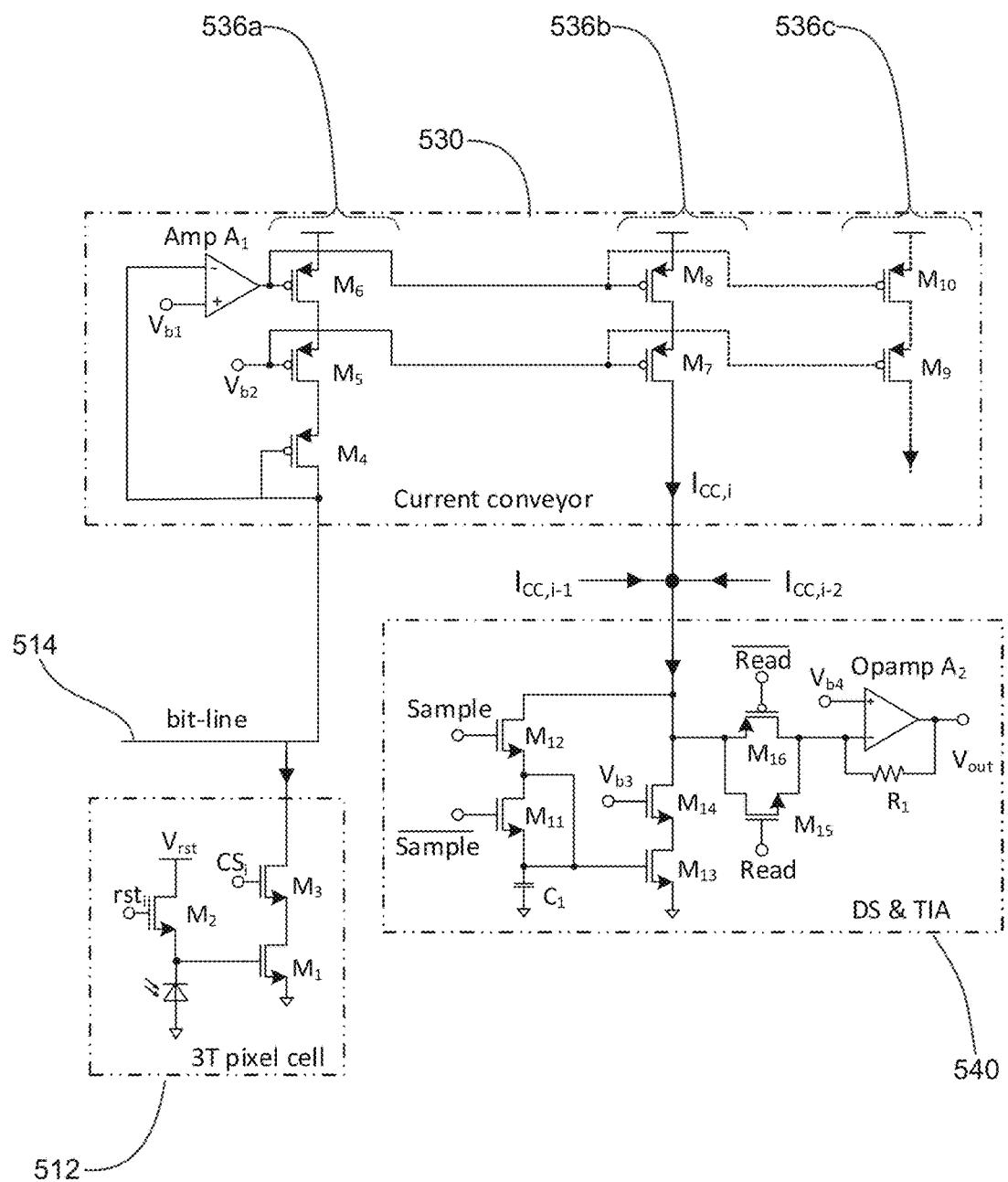
FIG. 5 depicts a circuit for reading pixel outputs and performing pixel summations in a CS measurement operation, according to aspects of the present disclosure.

FIG. 5 presents a circuit diagram of various components presented in architectural diagram 400. In particular, illustrated are architectures for a pixel cell 512 (corresponding to one of the plurality of pixel cells 412), a current conveyor 530 (corresponding to one of the plurality of current conveyors 430), and a DS & TIA 540 (corresponding to one of the plurality of pairs of delta double sampling circuits 440 and trans-impedance amplifiers 450). Pixel cell 512 is shown as a 3T current-mode active pixel cell, although it is understood that various other current-mode and voltage-mode pixel cells may be employed without departing from the scope of the present disclosure.

Current conveyor 530 includes cascode current mirrors 536a-c consisting of transistors $M_5$-$M_{10}$ and amplifier $A_1$, which forms a negative feedback loop with transistor $M_6$ to keep the voltage of bit-line 514 at $V_{b1}$. The first output branch 536b of the current mirror, implemented by transistors $M_7$ and $M_8$, is used by both types of current conveyors, and hence is drawn with a solid line. The second output branch 536c of the current mirror, implemented by transistors $M_9$ and $M_{10}$, is only needed for dual output current conveyors (e.g. $CC_2$, $CC_4$, etc.) and hence is drawn with a dotted line.

To keep transistor $M_1$ of the 3T pixel cell 512 in the linear region, the voltage $V_{b1}$ of bit-line 514 should be kept low. Meanwhile, the voltage at the current mirror output is preferred to be relatively high due to the consideration of signal swing headroom at TIA outputs. If pixel output ports were to be directly connected to the drain of transistor $M_5$ in the current mirror input branch 536a, this would potentially result in a relatively large voltage difference between its input and output ports, which negatively affects current mirror accuracy. To mitigate this problem, a diode connected transistor $M_4$ is inserted between the pixel bit-line 514 and the drain of transistor $M_5$ for level shifting purposes.

To cope with transistor threshold variations across the pixel array, delta double sampling can be implemented in the design, as discussed previously with respect to the plurality of delta double samplers 440. Unlike conventional image sensors that conduct double sampling for each pixel individually, the proposed design collectively performs double sampling for the entire group of pixels to be summed in a single CS measurement. This does not diminish the benefit of double sampling, since the current errors caused by threshold variations are linear terms added to the actual pixel signals. As illustrated inside the architecture of DS & TIA 540, transistors $M_{11}$-$M_{14}$ and capacitor $C_1$ form a current memory circuit that samples the summed pixel cell outputs after the pixel integration period. Transistor $M_{12}$ is a sampling switch and transistor $M_{11}$, half the size of $M_{12}$, is provided to compensate for the channel charge injection of $M_{12}$.

Figure 6:
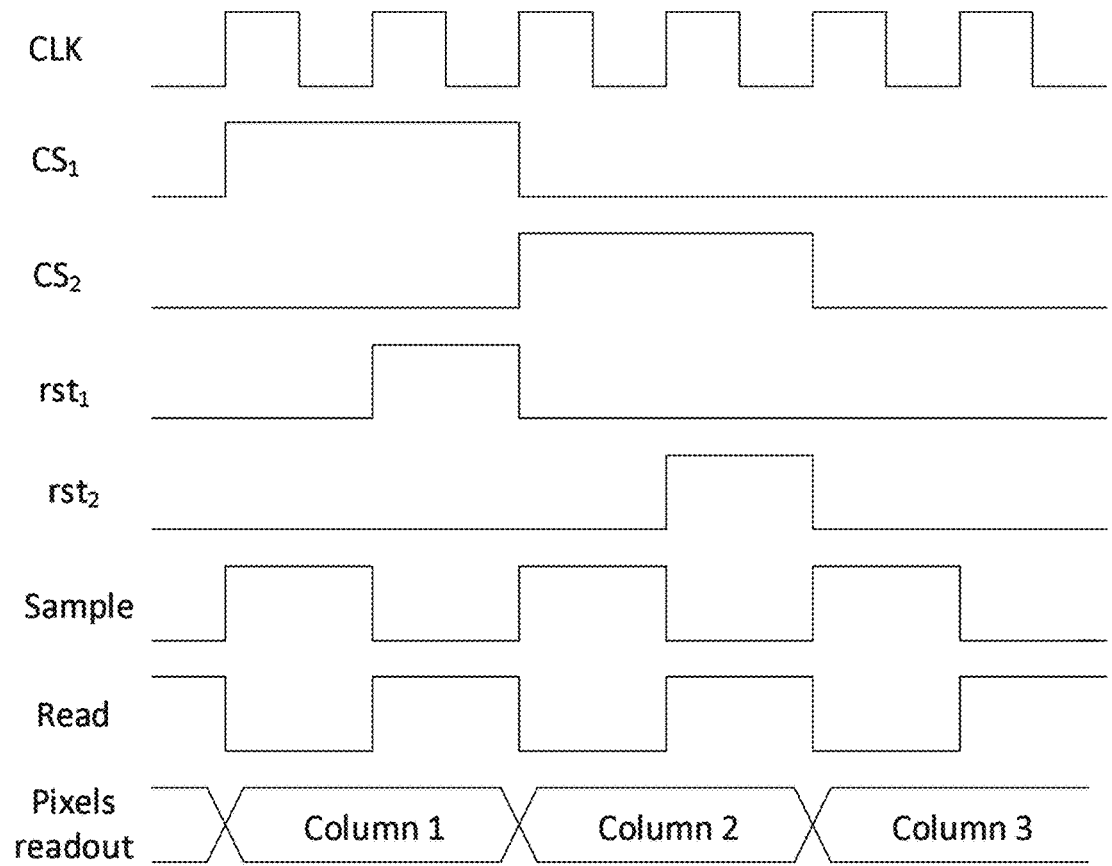
FIG. 6 depicts control signals during CS image sensor readout operation, according to aspects of the present disclosure.

The cascode structure of transistors $M_{13}$ and $M_{14}$ keeps $V_{DS13}$ at a constant level, thereby helping improve the accuracy of the sampling circuit. Immediately after finishing the above read operation, the pixel cells are reset and remain accessed. Then, the input of the DS circuit is the sum of the pixel output currents in a reset phase, which is the second sampling value of the double sampling operation. The two sampling values are naturally subtracted before being fed to the TIA via the transmission gate consisting of transistors $M_{15}$ and $M_{16}$. The control signals $CS_1$, $CS_2$ for reading out the first two pixel columns are depicted in FIG. 6, which indicates that the design takes two clock cycles to read a column and hence 512 cycles for the entire array.

FIG. 7 presents a comparison of the presently disclosed CS image sensor design with existing designs across various aspects. It can be seen that the present CS image sensor design is the only design that uses conventional compact pixel cells and at the same time does not require complex CS measurement circuits, which cover the functions of measurement vector generation and selecting pixels to perform summation according to the measurement vectors. The present design further eliminates the need of large LFSRs which are commonly used in all existing CS image sensor circuits.

The present design also does not require complicated column multiplexers since the pixel summation is restricted to within the same column. These factors advantageously benefit the power and hardware efficiency of CS image sensor circuits.

Simulation Results

To validate the CS image sensor circuits based on the present sparse measurement matrices, two CS image sensors with compression rates of 4 and 8 were designed. The pixel arrays of the two CS image sensors had the same size of 256×256 pixels and used the same 3T pixel cell design 512 shown in FIG. 5. The circuit implementation of the CS image sensor with compression rate 4 is illustrated in FIGS. 4 and 5. The sensor with compression rate 8 was implemented similarly based on the proposed sparse measurement matrices, and sums 12 pixels in a single CS measurement such that there are overlaps of 4 pixels between neighboring summation groups. Thus, for the CS image sensor with compression rate 8, four pixel rows share a bit-line, as opposed to the two pixel rows that share a bit-line for the CS image sensors with compression rate 4. The image sensor with a compression rate of 4 includes 128 current conveyors, and 64 DS and TIA circuits. The image sensor with a compression rate of 8 includes 64 current conveyors, and 32 DS and TIA circuits. The sensor circuits were designed using a 0.13 μm CMOS technology and 1.5V power supply voltage. The transistor sizes and other component values of the designs are shown in FIGS. 8 and 9.

Figure 10:
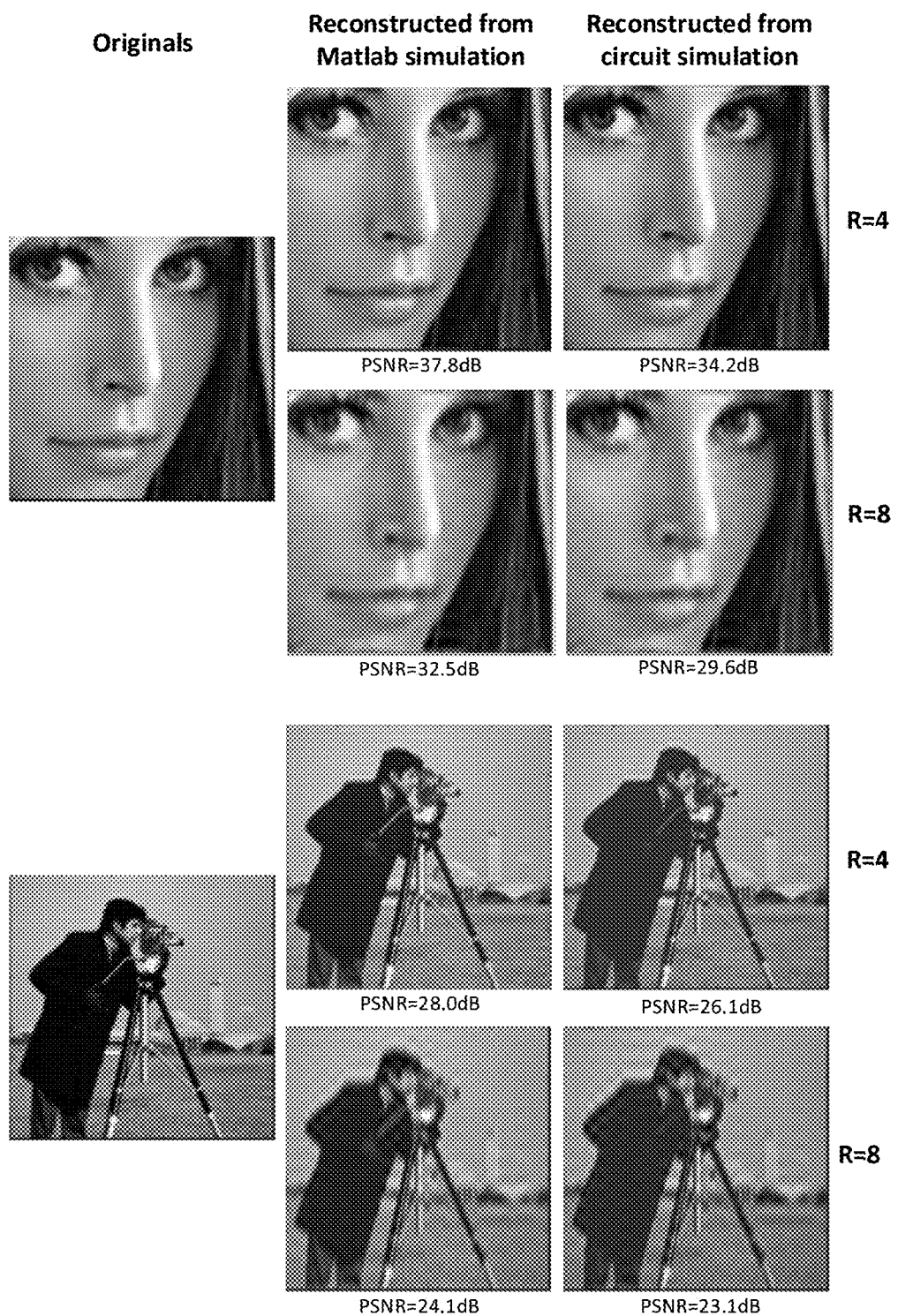
FIG. 10 depicts reconstructed Lena and Cameraman benchmark images from Matlab and circuit simulations, according to aspects of the present disclosure.

Circuit simulations were conducted to obtain CS image sensor outputs for the widely used benchmark images referred to as 'Lena' and 'Cameraman'. The photocurrents in pixel cells were emulated by current sources in the circuit simulations. After the circuit simulations, a Matlab $l_1$ minimization package was used to reconstruct the images from the sensor outputs. FIG. 10 shows the original images and the reconstructed images. The original images are placed on the left side of the figure, and the circuit simulation reconstructed images are placed on the right side of the figure.

For comparison purposes, Matlab programs were also used to simulate the CS measurement operations implemented on the CS image sensors, where the Matlab simulations were based solely on the mathematics of the disclosed measurement method rather than any specific circuit implementation and therefore yield an ideal case. The reconstructed images from the Matlab simulations are given in the middle panel of the figure. The PSNRs of the reconstructed images are listed underneath the pictures. It shows that the PSNR values of the reconstructed images from circuit simulation are very close to those obtained from Matlab simulation, indicating that the proposed CS image sensor circuits implement the proposed CS measurement method with high fidelity.

The power consumptions of the proposed CS image sensors were also compared with a conventional image sensor designed with the same CMOS technology. These comparisons showed that the power consumption of the two CS image sensors was approximately ¼ and ⅛ of that of the conventional image sensor. The simulated energy per frame of the two CS image sensors was also compared with existing CS image sensors, as listed in the bottom row of FIG. 7, which indicates that both the R=4 and the R=8 CS image sensors provide substantial power saving benefits over existing CS image sensors. The low power benefit of the proposed CS image sensors is mainly attributed to the simple CS measurement operations associated with the present sparse measurement matrices.

The present disclosure describes a new CS measurement method that can significantly simplify CS image sensor implementation. Instead of summing randomly selected pixels, the present method performs pixel summation for neighboring pixels within the same pixel column. The pixels to be added together for generating a single CS measurement sample are said to belong a block, with neighboring blocks designed to have certain overlaps and the first block designed to contain pixels at both ends of the pixel column. This measurement method is illustrated by the example shown in FIG. 2, in which the pixel column is assumed to contain 256 pixels, for which 64 measurements (pixel summations) are made.

The measurement matrix corresponding to the above CS measurement operation is described by the general formula of Equation (6). According to the formula, there are only a few non-zero elements in the measurement matrix, such that the matrix is considered a sparse measurement matrix. Although the above example assumes 256 pixels in a pixel column, the present measurement patterns can be easily modified for different sizes of pixel column or for different compression ratios by using the proposed general matrix formula.

The CS measurement method can be easily implemented on image sensors as shown in the designs of FIGS. 4 and 5. The disclosed CS image sensors require only a small and simple digital circuit to control the CS measurement operations. The present method eliminates the need for complex and power-hungry circuit blocks that are otherwise required in the existing CS image sensor circuits based on random measurement matrices. Such complex circuit blocks include large linear feedback shift registers (LFSRs) for generating pseudo random bit streams, shift register chains embedded into pixel arrays for pixel output control, and large multiplexer trees for routing signals from pixel cells to different summation circuits according to the random bit patterns. The resultant hardware-efficient design helps reduce sensor power consumption and cost.

In some embodiments, the present method can be targeted towards image sensors capturing natural images (images existing in the natural world). Statistical data show that the vast majority of the signal power of natural images is described by low frequency (or low index) coefficients in their sparse representations with properly selected sparse basis. The present method does not satisfy the RIP requirement, which is a very strong requirement to guarantee robust signal recovery for all types of sparse signals, regardless how the significant coefficients of the sparse signals are distributed in the sparse domains. Note that RIP is a sufficient but not necessary condition for signal recovery. By taking advantage of the aforementioned property of natural images, the present method leads to better image quality compared to that obtained with the conventional random matrix based CS measurement method.

Existing CS image sensors known in the art are based on dense random measurement matrices. They all require complicated circuit implementations, which degrade image sensor fill factors, power efficiency as well as the scalability of CS techniques for high resolution image sensors. The present techniques can dramatically simplify CS image sensor circuits, helping reduce image sensor cost and power consumption. The present method also improves the quality of images reconstructed from CS measurement samples.

While several particular embodiments of the present invention have been described herein, it will be appreciated by those skilled in the art that changes and modifications may be made thereto without departing from the invention in its broader aspects and as set forth in the following claims.

What is claimed is:

1. A method for compressive image sensing, the method comprising:
   obtaining analog pixel data from a plurality of pixel cells;
   arranging the analog pixel data into a matrix form to generate a pixel matrix;
   constructing a measurement matrix to divide the pixel matrix into one or more summation groups, such that:
      each summation group comprises a summed value of consecutive pixel data;
      each summation group contains an equal amount of overlapping pixel data from a same number of pixel cells; and
      the measurement matrix is sparse;
   obtaining the one or more summation groups by multiplying the measurement matrix with the pixel matrix, wherein a number of summation groups is less than a number of pixels in the plurality of pixel cells; and
   analyzing the one or more summation groups to recover an image captured by the plurality of pixel cells.

2. The method of claim 1, wherein the number of summation groups is equal to the number of pixels divided by a compression rate.

3. The method of claim 1, wherein the number of summation groups is equal to the number of rows of the measurement matrix.

4. The method of claim 1, wherein the measurement matrix and summation groups are constructed in physical form on a circuit.

5. The method of claim 1, wherein the plurality of pixel cells comprise an image sensor.

6. The method of claim 1, wherein the consecutive pixel data is obtained from the same number of pixel cells.

7. The method of claim 1, wherein a number of pixels in the equal amount of overlapping pixel data contained in each summation group is between ¼ and ¾ of a desired compression rate of the compressive image sensing.

8. The method of claim 1, wherein a number of pixels contained in each summation group is equal to the number of pixels in the plurality of pixel cells divided by the number of summation groups, added with a number of pixels in the equal amount of overlapping pixel data contained in each summation group.

9. A compressive sensing image system comprising:
   an array of pixel cells for generating pixel data;
   a plurality of bit-lines, each bit-line connected to one or more columns or one or more rows of pixel cells in the array;
   a measurement circuit coupled to the plurality of bit-lines, the measurement circuit configured to receive one or more outputs from the pixel cells via the plurality of bit-lines and divide the outputs into a plurality of summation groups, each summation group containing an equal number of pixel cell outputs, and each summation group containing a same number of shared overlap pixel cell outputs; and
   a processor, the processor configured to receive as input the plurality of summation groups from the measurement circuit and analyze the plurality of summation groups to recover an image captured by the array of pixel cells.

10. The system of claim 9, wherein the measurement circuit further comprises:
    a plurality of current conveyors, each current conveyor coupled to a bit-line; and a plurality of delta double sampling circuits, each delta double sampling circuit coupled to the output of two or more current conveyors and generating as output a summation group.

11. The measurement circuit of claim 10, wherein the plurality of current conveyors and delta double sampling circuits encode a sparse measurement matrix for application to the pixel data generated by the array of pixel cells.

12. The measurement circuit of claim 10, wherein the plurality of current conveyors and delta double sampling circuits are arranged such that:
the number of shared overlap pixel cell outputs is between ¼ and ¾ of a desired compression rate of the compressive sensing image system.

13. The measurement circuit of claim 10, wherein the plurality of current conveyors and delta double sampling circuits are arranged such that:
the number of pixel cell outputs contained in each summation group is equal to the number of pixel cells in the array divided by the number of summation groups, added with the same number of shared overlap pixel cell outputs.

14. The system of claim 10, wherein the number of CS measurement operations performed is less than the number of pixel cells in the pixel array and is substantially equal to a number of summation groups in the plurality of summation groups.

15. The system of claim 10, wherein the CS measurement circuit further comprises a plurality of trans-impedance amplifiers each coupled to the output of a delta double sampling circuit.

16. The system of claim 9, wherein the array of pixel cells comprises current-mode pixel cells.

17. The system of claim 9, wherein the array of pixel cells comprises voltage-mode pixel cells.

18. The system of claim 9, wherein the number of summation groups is less than the number of pixels in the array of pixel cells.

19. The system of claim 9, wherein the plurality of bit-lines are connected to one or more columns of the array of pixel cells and the bit-lines are read in parallel by the CS measurement circuit in a row-by-row fashion.

20. The system of claim 9, wherein the plurality of bit-lines are connected to one or more rows of the array of pixel cells and the bit-lines are read in parallel by the CS measurement circuit in a column-by-column fashion.

* * * * *